No. 694,466. Patented Mar. 4, 1902.
G. C. FERGUSON.
CORK EXTRACTOR.
(Application filed July 22, 1901.)
(No Model.)
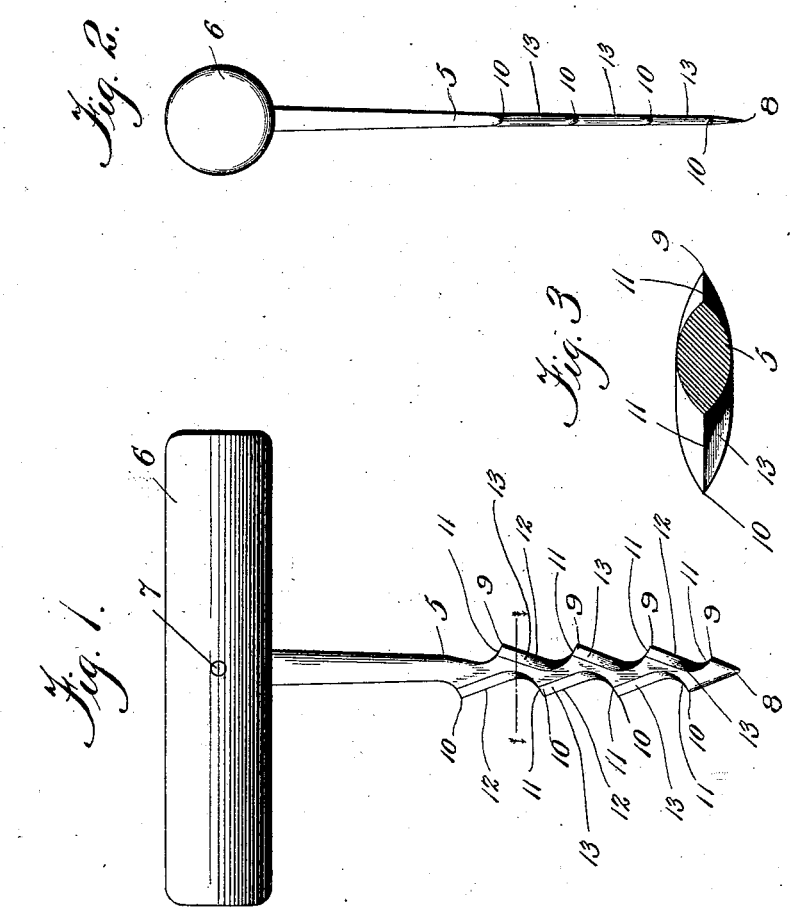
Witnesses:
J. Ed. Page.
W. H. Bernhard.
George C. Ferguson, Inventor,
By Marion & Marion
Attorneys

UNITED STATES PATENT OFFICE.

GEORGE CANNON FERGUSON, OF FREDERICTON, CANADA.

CORK-EXTRACTOR.

SPECIFICATION forming part of Letters Patent No. 694,466, dated March 4, 1902.

Application filed July 22, 1901. Serial No. 69,178. (No model.)

*To all whom it may concern:*

Be it known that I, GEORGE CANNON FERGUSON, a subject of the King of Great Britain, residing at Fredericton, county of York, Province of New Brunswick, Canada, have invented certain new and useful Improvements in Cork-Extractors; and I do hereby declare that the following is a full, clear, and exact description of the invention, such as will enable others skilled in the art to which it appertains to make and use the same.

My invention relates to improvements in cork-extractors; and the object that I have in view is to provide a simple and inexpensive contrivance which may be thrust into and embedded firmly in a cork with such expedition and ease as to secure the withdrawal of the cork in less time than is required in the use of ordinary corkscrews.

With these ends in view the invention consists in the novel construction and arrangement of parts, which will be hereinafter fully described and claimed.

In the drawing hereto annexed, forming a part of this specification, Figure 1 is a side elevation of a cork-extractor constructed in accordance with my invention. Fig. 2 is an edge elevation of the implement shown by Fig. 1. Fig. 3 is a transverse section on the line 3 3 of Fig. 1 and on a greatly-magnified scale.

The same numerals of reference denote like parts in all the figures of the drawing.

5 designates the blade or bar, and 6 is the handle, in which one end of the blade or bar is firmly embedded and is secured by a transverse pin 7. The blade 5 is flattened laterally in contradistinction to a circular shank, such as is commonly employed in corkscrews, the flattened form of the blade being indicated more particularly by Figs. 2 and 3. The blade is tapered from its straight upper portion down to its lower extremity, and this extremity of the flattened blade is pointed and sharpened, so as to produce an entrance-point 8, which may be easily and quickly thrust into a cork. The flattened blade is provided with a plurality of barbs or spurs 9 10, the same being disposed on opposite side edges of the blade and with the barbs 9 in alternate or staggered relation to the barbs 10, as clearly shown by Fig. 1. A peculiarity in the invention consists in making each barb or spur with a substantially abrupt shoulder 11 on its top side, said shoulder having a rounded juncture with the blade, and a substantially broad or flat face, whereby the shoulder may have firm and secure engagement with the cork when it is embedded therein. The spur or barb has an inclined long under face 12, which extends downwardly and inwardly, so as to merge in a rounded portion of the next barb, and said inclined long under face of the barb is beveled or inclined, as at 13, thus giving to the barb a sharpened under edge, by which it is made to easily penetrate the cork when the implement is thrust downward into the same. The lowermost barbs 9 10 have their under faces beveled transversely, and said edges converge so as to form the entrance-point 8.

In using my improved implement the handle 6 is grasped firmly by the hand and the entrance-point 8 is placed over the middle of the cork which it is desired to extract. The implement is now forced bodily downward in a straight continuous direction or thrust as distinguished from a turning or screw-like movement, and during this thrust of the implement the entrance-point 8 and the sharpened and inclined under edges 12 of the barbs cut or cleave their way through the cork, thus allowing the ready and expeditious entrance of the extractor. The barbed part of the implement having been forced into the cork the proper distance, so that a proper number of the barbs or spurs will be embedded therein, the operator now gives a quarter-turn to the handle, and thereby turns the barbed blade in the cork, whereby the abrupt shouldered parts of the barbs are made to firmly engage with the cork and the cork itself is loosened in the mouth of the bottle. It only remains for the operator to pull the implement and the cork upward, so as to extract the cork from the bottle.

Although I have described in detail and at some length the operation of inserting the implement and extracting the cork, it is to be understood that this operation may be performed very easily and quickly.

Having thus described my invention, what I claim as new is—

A cork-extractor comprising a flattened and pointed blade provided with spurs or barbs on its opposite side edges and in alternate or staggered relation, each barb having a relatively abrupt top face and a sloping and cross-sectionally beveled under face, and a suitable handle secured to the blade, substantially as described.

In witness whereof I have hereunto set my hand in the presence of two witnesses.

GEORGE CANNON FERGUSON.

Witnesses:
WILFRED BURDEN,
ALBERT COLBY SMITH.